Nov. 22, 1927.
J. E. PRINCE ET AL
1,650,153
LIGHT ATTACHMENT FOR HUBS AND SPINDLES
Filed Dec. 8, 1925
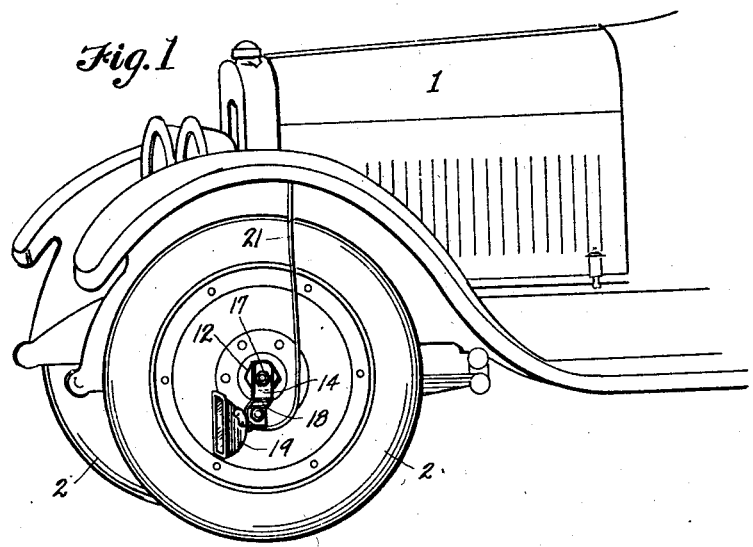
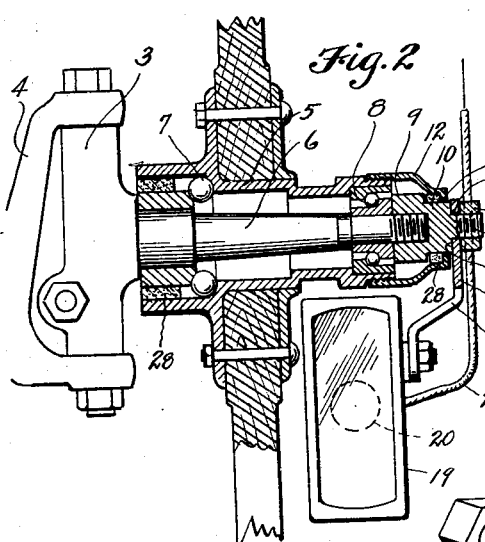
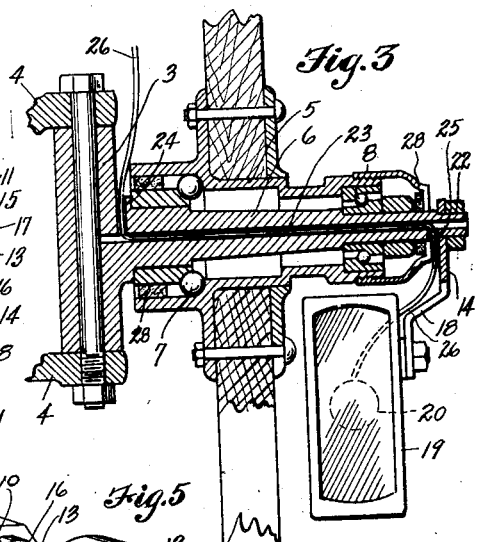
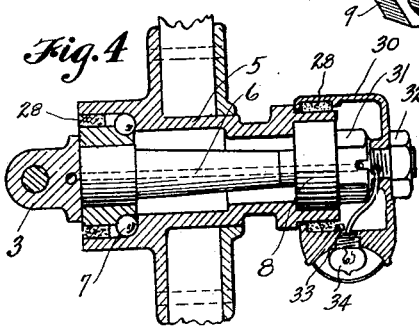
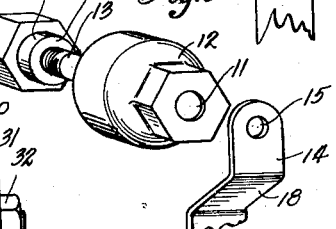
INVENTOR
JOSEPH E. PRINCE
JAMES E. SCHOOLEY
BY
Richard J. Cook
ATTORNEY Patented Nov. 22, 1927.

1,650,153

UNITED STATES PATENT OFFICE.

JOSEPH E. PRINCE AND JAMES E. SCHOOLEY, OF SEATTLE, WASHINGTON.

LIGHT ATTACHMENT FOR HUBS AND SPINDLES.

Application filed December 8, 1925. Serial No. 74,095.

This invention relates to improvements in spotlights for motor vehicles and more particularly to spotlights of a character adapted to be supported from the spindle of one of the steering wheels of an automobile; it being the principal object of the invention to provide means whereby a spotlight may be supported from the outer end of the spindle adjacent the outside of the wheel in such manner that the light housing will not extend outside of the wheel hub cap and which provides that the light beam may be cast at a desirable point along the roadway and will change in accordance with every change of direction of the wheel.

It is also an object of the invention to provide a spindle attachment adapted to replace and serve the purpose of the usual wheel retaining nut that threads onto the outer end of the spindle and which has an extension on which a spotlight support may be fastened.

Another object of the invention resides in the provision of non-rotative hub caps for the steering wheels of an automobile and the provision of spotlights within the caps.

A still further object resides in the provision of a spindle having central channel through which a circuit wire may be extended to a spotlight mounted at the end of the spindle.

Other objects of the invention reside in the details of construction of the various parts and in their combination with parts already existing and forming a part of the vehicle to which the spotlight is attached.

In accomplishing these and other objects of the invention, I have provided the improved details of construction, the preferred forms of which are illustrated in the accompanying drawings, wherein—

Figure 1 is a perspective view of an automobile equipped with a spotlight in accordance with the present invention.

Figure 2 is a sectional view through a steering wheel hub, illustrating the construction and mode of application of a spindle attachment embodied by this invention.

Figure 3 is a similar view illustrating an alternative construction and a channeled spindle for a circuit wire.

Figure 4 is a sectional view showing a hub cap equipped with a spotlight.

Figure 5 is a perspective view of the mounting nut, hub cap and bracket.

Referring more in detail to the several views of the drawings—

1 designates an automobile which may be one of any of the usual types of construction, having its front wheels 2 carried by steering knuckles 3 pivotally mounted in yokes 4 at the ends of the front axle; the wheels having their hubs 5 rotatable about the spindles 6 on suitable anti-friction bearings, as indicated at 7 and 8.

Threaded onto the outer end of the spindle and seated against the outer ring of bearings 8 is a nut 9 which replaces the usual retaining nut used and which serves to retain the wheel on the spindle. This nut has a short cylindrical extension 10 coaxial of the spindle that fits rotatably within a circular opening 11 in the end of the hub cap 12 and which terminates in a short threaded shank 13 of reduced diameter which serves as a mounting for a spotlight mounting bracket 14.

The bracket 14 is provided with an opening 15 in one end for receiving the shank 13 so that the bracket may be seated against a shoulder 16 at the base of the shank and secured thereagainst by a lock nut 17. The other end of the bracket is bent inwardly, as at 18, and supports a spotlight housing 19 in which there is an electric lamp 20 with which a circuit wire 21 is connected.

While, in the drawing, we have illustrated the spotlight as being below the wheel hub, it is to be understood that it can be extended upwardly, forwardly, rearwardly or in any other direction desirable or suitable, and the type or size of light can be changed in accordance with what is required.

In Figure 3 I have illustrated an alternative construction in which the spindle is elongated sufficiently that its threaded end extends through the hub cap opening and adjacent its end it has a slightly reduced portion 22 for mounting the bracket 14 which is secured by a lock nut 17. In this view we have also shown a channel 23 centrally through the spindle with a lateral opening 24 within the inner end of the wheel hub and a lateral opening 25 just outside of the hub cap through which a circuit wire 26 may be extended to the lamp.

Suitable packing, such as felt washers 28, may be provided at the inner end of the hub and in the hub cap to prevent leakage of oil or grease.

In Figure 4 we have illustrated still another alternative construction in which the outer end of the spindle is extended sufficiently to provide a fixed mounting for a non-rotative hub cap 30 which is locked between nuts 31 and 32. Mounted within a socket 33 in the front of the cap is a lamp 34 which is connected with a circuit wire 35 extended through a channel 23 in the hub.

It is to be understood that construction of the various parts of the attachment will be determined to a certain extent by the design of the vehicle to which the attachment is to be applied, but the general design and mode of application will be the same for all vehicles where the lights are to be applied as attachments. Where such lights are provided as regular equipment, the spindles would be elongated and bored out as the construction illustrated in Figure 3.

The character of the lamp used in the construction of Figure 4 will depend somewhat on the type or design of hub cap used and this can be varied as desired so as to embody a large lamp for driving purposes or a small lamp for parking.

Having thus described our invention, what we claim as new therein and desire to secure by Letters-Patent is:

1. In a vehicle of the character described, the combination with a steering wheel spindle, and a wheel on said spindle provided with a hub cap having an opening therein alined with the spindle of a nut threaded onto the outer end of the spindle and provided with a shank extended through the hub cap opening and a spotlight supported from said shank.

2. In a vehicle of the character described, the combination with a steering wheel spindle, and a wheel on said spindle provided with a hub cap having an opening therein alined with the spindle of a nut threaded onto the outer end of the spindle and provided with a shank extended through the hub cap opening, a lamp supporting bracket adjustably mounted on said shank and a spotlight supported by the bracket; said bracket being directed inwardly and supporting the light within the vertical plane of the outer end of the hub cap.

Signed at Seattle, King County, Washington, this 30th day of November, 1925.

JOSEPH E. PRINCE.
JAMES E. SCHOOLEY